United States Patent [19]
Fry et al.

[11] Patent Number: 5,153,048
[45] Date of Patent: Oct. 6, 1992

[54] FABRIC COVERED CORRUGATED BOARD

[75] Inventors: William F. Fry, Columbia; Chester W. Hallett; Nancy E. Mentzer, both of Lancaster, all of Pa.

[73] Assignee: Armstrong World Industries, Inc., Lancaster, Pa.

[21] Appl. No.: 487,309

[22] Filed: Mar. 2, 1990

[51] Int. Cl.⁵ .......................... B32B 3/30; D04B 1/00
[52] U.S. Cl. .................................... 428/163; 428/161; 428/224; 428/167; 428/184; 428/245
[58] Field of Search ............... 428/163, 167, 224, 245, 428/161, 184

[56] References Cited

U.S. PATENT DOCUMENTS

| | | | |
|---|---|---|---|
| 1,399,455 | 12/1921 | Armstrong | 428/184 |
| 2,335,208 | 11/1943 | Haryrap | 428/184 |
| 3,920,872 | 11/1975 | Ollinger | 428/198 |
| 4,668,559 | 5/1987 | Mussallem | 428/167 |

Primary Examiner—George F. Lesmes
Assistant Examiner—Kathryne E. Shelborne

[57] ABSTRACT

A fabric covered board structure made with a base of a mineral fiber material having a corrugated face surface. A discontinuous coating of high tack adhesive on the corrugated face surface and a flexible textile or vinyl sheet adhered to the face surface by the adhesive.

2 Claims, 1 Drawing Sheet

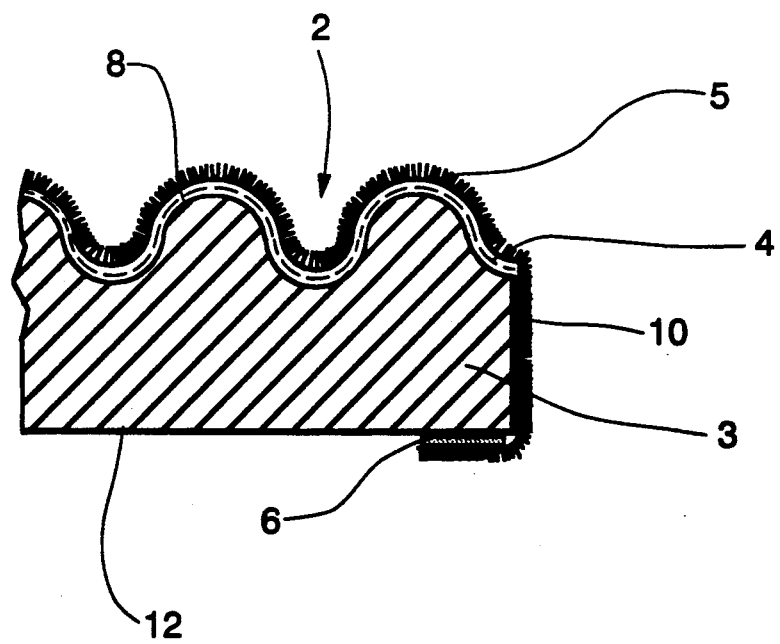

FABRIC COVERED CORRUGATED BOARD

BACKGROUND OF THE INVENTION

1. Field of the Invention

The invention herein is a fabric faced fiberboard and, more particularly, an acoustical wallboard.

2. Description of the Prior Art

The basic fabric covered wallboard is shown in U.S. Pat. No. 3,920,872. This is a flat surface wallboard.

The use of a corrugated surface for a ceiling board for acoustical purposes is known in the art.

SUMMARY OF THE INVENTION

A fabric covered board structure comprising a mineral fiber board having good impact resistance due to a board density of at least 1.5 lbs./board foot, and preferably 1.95 lbs./board foot. The board has in part a corrugated face surface of parallel spaced grooves and hills forming a surface area about one and one-third times that of a flat uncorrugated board face surface to yield a sound absorption rating (NRC) of about 0.45. The corrugated face surface being coated with a light discontinuous coating of adhesive having a high tack. A flexible porous textile or vinyl fabric is adhered to the grooves and hills of the corrugated face by the adhesive coating.

The board structure has a face surface devoid of pin holes or other types of mechanically formed acoustical openings.

BRIEF DESCRIPTION OF THE DRAWING

The drawing is an end view in section of a portion of the structure of the invention.

DESCRIPTION OF THE PREFERRED EMBODIMENT

The fabric covered board structure 2 of the drawing is composed of a base board 3, with in part a corrugated front face 8, side 10 and back 12, a discontinuous adhesive coating 4, and a fabric 5 covering the corrugated surface. The fabric can be wrapped around the side 10 of the board 3 and held on the back 12 of the board by a strip of adhesive 6 or alternatively only on the side 10.

The base board 3 is a conventional ceiling board such as the "Corrugated Crossgate ®" ceiling board sold by Armstrong. This board is of mineral wool construction and formed by a conventional water-laid process on paper making machinery. Since the product can be used on walls it must have some impact resistance to prevent surface damage. The impact resistance is secured by forming the board with a density of at least 1.5 lbs./board foot, and preferably 1.95 lbs./board foot. If fiber glass is used, density could be less and the natural recovery of the board surface functions to give the appearance of impact resistance. Here density could be as low as 0.5 lbs./board foot. The board should provide some sound absorption without punching holes or other acoustical openings in the face of the board. If increased sound absorption is desired, the board can be punched prior to applying the fabric. Since the corrugated surface is cut in the surface of the board, the board will have a surface which is porous to sound and will provide good sound absorption with a rating of NRC=0.45. The corrugated surface appears to help sound absorption since the surface area of the corrugations is 1-⅓ times that of the flat surface of the original board before the corrugations are cut in the face surface of the board.

The fabric covering the corrugations may be a woven or non-woven textile fabric or a porous vinyl fabric. It must be porous to sound so that sound waves will pass through the fabric and be absorbed by the board surface. A preferred fabric is a crepe weave polyester made by Guilford of Me. and sold under the trademark "Corina".

The adhesive is critical to the proper adherence of the fabric to the grooves of the corrugated surface. The adhesive must be applied in a discontinuous coating so the adhesive coating is porous to sound. The coating is sprayed on the corrugated surface as a light coating of about 20 grams/square foot. Typical pressure sensitive or regular adhesives tested did not have sufficient quick and good tack to hold the fabric into the corrugations immediately and permanently after fabric application. An adhesive that has the ability to quickly set up and provide immediate high tack is:

| Material | % by Weight |
| --- | --- |
| Covinax 114 - Vinyl Acrylic Adhesive by Franklin Chemical | 36.0 |
| Covinax 324 - Vinyl Acrylic Adhesive by Franklin Chemical | 36.0 |
| Decabromodiphenyl Oxide - fire retardant | 20.0 |
| Antimony Trioxide - fire retardant | 8.0 |
| | 100.0 |

The adhesive must have the ability to provide a quick and good hold of the adhesive to the fabric when the fabric is placed in the groove so that the fabric will stay in the groove while subject to stresses forcing the rest of the fabric around the adjacent hill. Quick hold means that the fabric and adhesive bind together with less than one second application of pressure. High tack exists with the above adhesive in that after 2 minutes drying after application, the adhesive is sticky to the touch. Other adhesives tested were not sticky to the touch after 2 minutes of drying.

What is claimed is:

1. A fabric covered board structure comprising:
   a) a mineral fiber board having good impact resistance due to a board density of at least 1.5 lbs./board foot, and preferably 1.95 lbs./board foot, said board having a corrugated face surface of parallel spaced grooves and hills forming a surface area one and one-third times that of a flat uncorrugated board face surface to yield a sound absorption rating (NRC) of about 0.45,
   b) said corrugated face surface being coated with a light discontinuous coating of adhesive having a high tack, and
   c) a flexible porous textile or vinyl fabric adhered to the grooves and hills of the corrugated face by said adhesive coating.

2. A fabric covered board structure as set forth in claim 1 wherein the face surface of the board is devoid of pin holes or other types of mechanically formed acoustical openings.

* * * * *